United States Patent Office 3,060,415
Patented Oct. 23, 1962

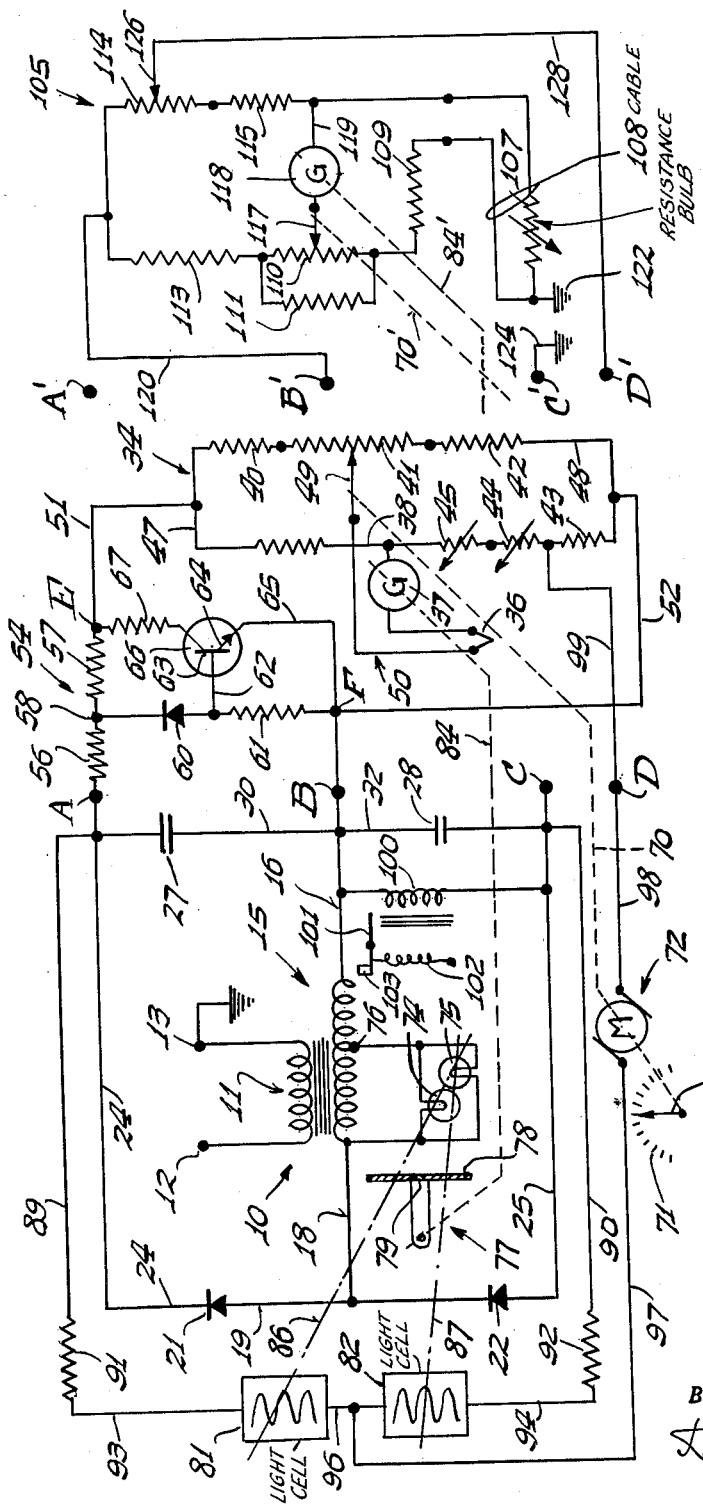

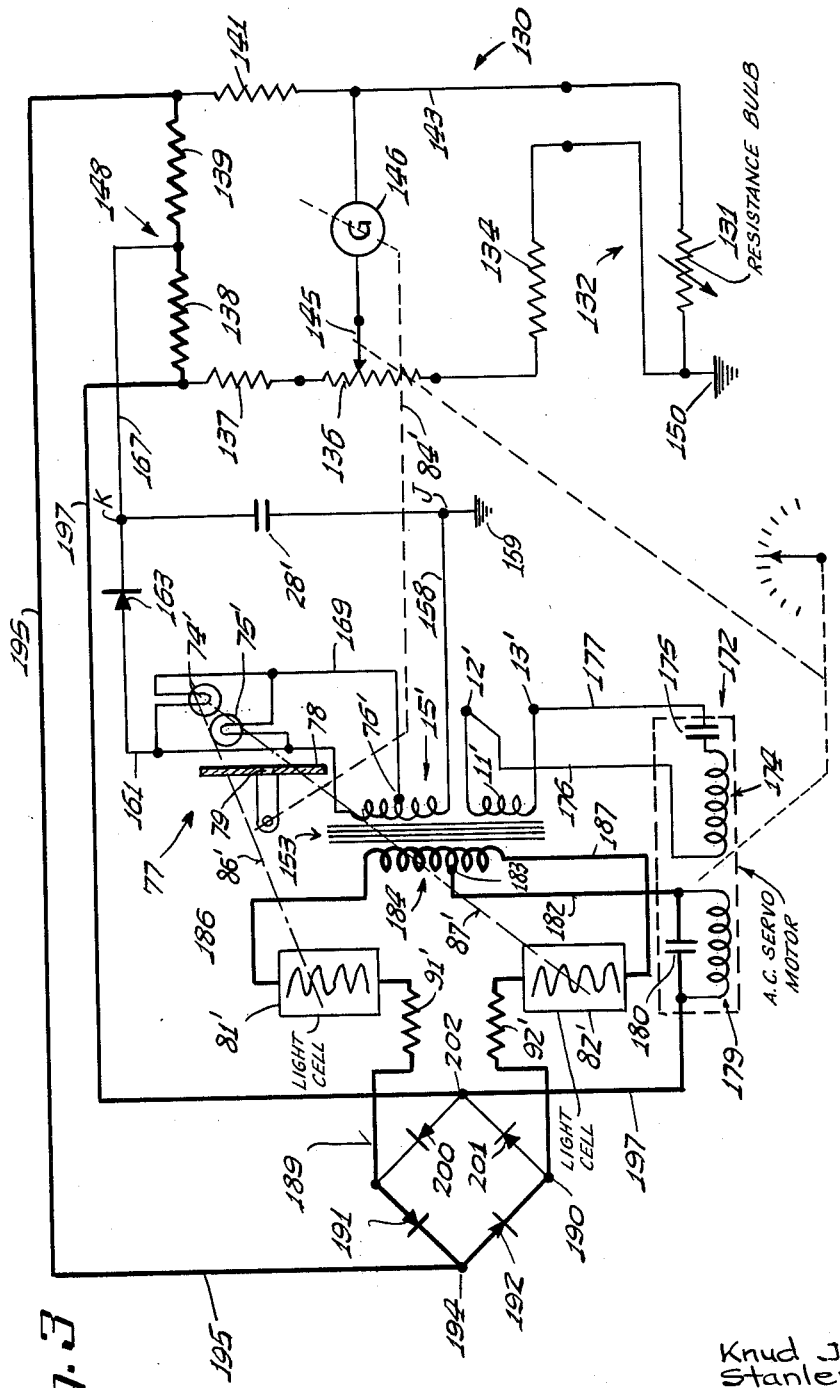

3,060,415
SERVO-TYPE ELECTRICAL INDICATOR
Knud J. Knudsen, Middlebury, Conn., and Stanley J. Smith, Chappaqua, N.Y., assignors to Lewis Engineering Company, Naugatuck, Conn., a corporation of Connecticut
Filed Oct. 28, 1960, Ser. No. 65,747
9 Claims. (Cl. 340—187)

This invention relates to servo-type electrical indicators as used for obtaining temperature indications and the like, and more particularly to indicators of this class wherein light and light-responsive means are utilized as part of the control or actuator mechanism of the indicator.

An object of the invention is to provide a novel, considerably simplified servo-type indicator utilizing conductive-type photosensitive cells directly controlling the motive means or electric motor.

Another object of the invention is to provide an improved servo-type indicator of simple construction, wherein the transducer lead resistance does not affect either the accuracy, anticipation or damping of the instrument.

A further object of the invention is to provide an indicator as above set forth, wherein induced A.C. voltages in the transducer circuit will not affect the accuracy of the instrument.

An additional object of the invention is to provide a novel servo-type indicator in accordance with the foregoing, wherein an adjustable, fast and reliable response is had to the changing conditions being measured, as for example the temperature changes.

Still another object of the invention is to provide an improved indicator as above characterized, which is adaptable to the utilization of either a D.C. motive means in the control or else an A.C. motive means.

A feature of the invention resides in the provision of a novel control and anticipator circuit in a servo-type indicator, utilizing an A.C. motive means and a D.C. balancing circuit.

Still another object of the invention is to provide an improved servo-type indicator of the kind specified, which is not only fast and accurate but also relatively small, light in weight and compact whereby it has a wide range of usefulness.

Other features and advantages will hereinafter appear.

In the drawings accompanying this specification, similar characters of reference are used to designate like or similarly-functioning components throughout the several views, in which:

FIG. 1 is a schematic circuit diagram of an improved servo-type electrical indicator as provided by the invention, utilizing a thermo-couple type sensing element and a D.C. adjusting motor.

FIG. 2 is a schematic circuit diagram of a portion of an electrical indicator made in accordance with the invention, such diagram showing a resistance bulb type sensing element and being substitutable for a portion of the circuit diagram of FIG. 1, to replace the thermocouple type balancing or bridge circuit and also the voltage regulator circuit of the previous figure. Connecting posts by which such substitution may be readily understood are lettered A, B, C, D, A', B', C', and D' in FIGS. 1 and 2.

FIG. 3 is a schematic circuit diagram of a servo-type electrical indicator illustrating another embodiment of the invention, wherein the balancing circuit utilizes a resistance-bulb type sensing element and wherein the adjusting motor is of the alternating-current type, comprising more specifically an A.C. servomotor.

Referring first to FIG. 1, the improved servo-type electrical indicator device shown therein is arranged to be operated from a source of alternating current, and for this purpose has a power supply transformer 10 provided with a primary winding 11 connected to terminals 12 and 13 which may be joined to a suitable source of supply as for example a 28 volt alternating current source or a 117 volt alternating current source.

The transformer 10 has a tapped secondary winding 15 one end of which is connected by a wire 16 to a D.C. supply binding post which has been given the letter B. The binding post B serves as the negative supply terminal for a balancing or bridge circuit described below, and also as a positive power supply terminal for an adjusting motor also described below.

The D.C. power for the balancing circuit and also for the adjusting motor is obtained by the use of rectifiers connected with the secondary coil 15, and for this purpose the remaining end of the secondary coil is connected by a wire 18 to a common junction or lead 19 of half-wave rectifiers 21 and 22 which are in turn respectively connected to D.C. power supply wires 24 and 25 in turn connected with smoothing or filter capacitors 27 and 28 having a common lead or wire 30 connected with the wire 16 joined to the binding post B. The power supply wires 24 and 25 are also respectively connected to additional D.C. power supply binding posts A and C, the post A having a positive polarity with respect to the post B and being paired therewith. The binding post C is also paired with the post B and has a negative polarity with respect thereto, as indicated.

The voltage across the terminals A and B is, as above mentioned, utilized to energize a balancing or bridge circuit indicated generally by the numeral 34, which has an electrical sensing element 36 responsive to changes in temperature. The balancing circuit 34 includes a sensitive instrument movement such as the galvanometer 37, such instrument movement having one terminal connected with the thermocouple 36 and having its other terminal connected with a wire 38 which may be considered as comprising one "corner" junction of the bridge 34.

The bridge circuit has the usual form of a closed loop (which is commonly depicted in the shape of a diamond), in which are disposed resistors 39, 40, 41, 42, 43 (the latter having a special function provided by the invention, as will be later brought out); the loop also has resistors 44 and 45, all the said resistors being connected in series. The resistors 39 and 40 are joined by a lead or wire 47 which may be considered as another "corner" junction of the bridge 34, and the resistors 42 and 43 are joined by a wire 48 constituting yet another "corner" junction of the bridge circuit. The resistor 41 is part of a potentiometer-type device having a slider or contact 49 which may be considered as comprising the remaining or fourth "corner" junction of the bridge circuit. The adjustable contact 49 is connected to the remaining terminal of the thermocouple 36, thereby completing the balancing circuit comprising the bridge 34.

The resistors 44 and 45 are shown as being adjustable, and constitute the thermocouple cold juncture compensators of the circuit.

The bridge 34 is energized by wires or leads 51 and 52 respectively connected to opposite "corner" junctions and receiving energy from terminals E and F respectively of a voltage regulator device indicated generally by the numeral 54, said device being described and claimed in the copending application of Knud J. Knudsen Serial No. 656,422 filed May 1, 1957, and entitled D.C. Regulator and Control Circuit, owned by the same assignee as the present invention and application.

The voltage regulator 54 comprises essentially resistors 56 and 57 connected in series between the terminals A and E, the junction 58 of such resistors being connected to a diode 60 which is joined to a resistor 61 in turn connected to the terminal F. The junction of the diode 60 and resistor 61 is connected by a wire 62 to the base 63 of transistor having an emitter 64 connected by a wire 65 to the terminal F. The transistor has a collector 66 connected to a resistor 67 which is in turn connected to the terminal E. Essentially, the regulator 54 maintains a relatively constant potential difference between the terminals E and F, whereby the voltage impressed on the bridge 34 is prevented from varying to any appreciable extent with changes in loading or supply.

It will be understood that by the above organization adjustment of the contact or slider 49 may effect a balance between the voltages of the thermocouple 36 and of the points 38, 49 of the bridge circuit, whereby no current will flow through the galvanometer 37, thereby resulting in a zero deflection of such instrument. A change in the temperature of the thermocouple 36 will change the E.M.F. produced thereby, and will effect an unbalance of the circuit by which the galvanometer 37 will be caused to deflect in one direction or the other from its zero position, depending on whether the thermocouple voltage rises or drops due to rise or drop of the temperature.

Upon readjustment of the slider 49 a new balance may be effected, as indicated by the return of the galvanometer 37 to its condition of zero deflection. Thus, the new balance will be characterized by a new position of the slider 49 on the resistor 41, and the various positions of the slider 49 in effecting balance for different temperature conditions will be indicative of the different values of temperature to which the thermocouple 36 is subjected. This, of course, is the usual action of a bridge-type temperature indicator.

In FIG. 1 an indicating pointer 69 is illustrated together with a schematic showing of a mechanical connection to the slider 49, such showing being indicated by the broken line 70 in this figure. Accordingly, the various positions of the slider 49 will be shown by the pointer 69, and the scale 71 for such pointer may be graduated in degrees of temperature, thereby to read the temperature values directly.

In accordance with the present invention a novel and simple, fast and accurate control means is provided, in conjunction with the galvanometer 37 and the slider 49, whereby deflection of the galvanometer will automatically effect adjustment of the slider 49 to re-establish a balance in the bridge circuit and at the same time indicate temperature values on the scale 71. This simple control means embraces the use of light beams and light-sensitive conductive cells in conjunction with a directly controlled or energized electric motor, to effect the adjustment of the slider 49. In FIG. 1, the electric motor is indicated at 72, such motor being shown as mechanically coupled to the slider 49 to physically drive or shift the latter, this being indicated by the broken line 70 also.

By the circuit shown in FIG. 1, either the voltage existing between the terminal points A and B or else the voltage existing between the terminal points B and C is utilized to energize and effect turning of the motor 72. When one voltage is used, the motor is driven in a forward direction, and when the other voltage is used the motor is driven in a reverse direction. A novel organization involving an efficient type of light-sensitive switching cell is utilized, as will be hereinafter fully explained, in determining which of the two voltages is impressed upon the motor.

The improved and simplified control of the invention, in the embodiment illustrated in FIG. 1, comprises a pair of adjoining incandescent electric bulbs 74 and 75, said bulbs being connected in parallel as shown and being energized from a portion of the secondary winding 15, as by connection to a tap 76 thereof. The bulbs 74 and 75 are thus continuously energized and lighted. The control further comprises a movable shutter device 77 comprising a plate 78 having a light admitting slot 79.

In conjunction with the bulbs 74 and 75 and the shutter 77 there is provided by the invention a pair of light-sensitive conductive cells 81 and 82 which are so arranged that either one or the other may receive light jointly supplied by the bulbs 74, 75 upon the shutter 77 being suitably shifted. The bulbs 74 and 75 may be disposed one above the other, for example, in a vertical line which is parallel to the slot 79 by which both bulbs may light each of the cells 81, 82. By the use of two bulbs instead of one a safety feature is had, since burnout of one bulb will not render the system inoperative due to either bulb supplying sufficient light to activate the light cells. As shown in the figure, the solid portions of the shutter 77 may obstruct the light which tries to pass from the two lamps 74, 75 to either of the light sensitive cells 81, 82. However, should the shutter 77 be shifted or pivoted either upward (counterclockwise) or downward (clockwise) it would enable light from both the lamps 74, 75 to strike either the cell 81 or else the cell 82. The shutter 77 is mechanically coupled to (as by being carried by) the movable part of the galvanometer 37 so as to be shifted thereby in response to deflection of the galvanometer, and such mechanical coupling is indicated by the broken line 84 shown in the figure. The lines of sight between the two bulbs 74, 75 and the light sensitive cells 81, 82 are indicated respectively by the broken lines 86 and 87. When light strikes one of the cells 81, 82 it renders the same conducting whereby an appreciable current may flow through the cell, and accordingly, such cell may constitute a light-operated switching device of high efficiency. Use is made of this to effect selective energization of the adjusting motor 72, in the following manner: From the wires 24 and 25 connected to the terminals A and C leads 89 and 90 are brought to current-limiting resistors 91 and 92 respectively, and from such resistors wires 93 and 94 are connected respectively to the cells 81, 82. The remaining terminals of the cells are connected together by a jumper 96, and such connection is joined by a lead or wire 97, to the D.C. motor 72. From the motor 72 a wire 98 is brought to the terminal post D, and from the latter a wire 99 connects to the junction between the resistors 43 and 44 of the bridge circuit 34.

It will now be seen that use is made of the potential between the terminals A and B, and the terminals B and C for effecting a selective (forward or reverse) D.C. energization of the motor 72 to cause the latter to turn in either forward or reverse directions, depending on whether one or the other of the light-sensitive cells 81, 82 is made operative in response to its illumination. For, from the terminal post B the circuit follows the wire 52, the resistor 43 included in the bridge 34, the wire 99, the motor 72, the wire 97, one or the other of the light-sensitive cells 81, 82 the associated current limiting resistor 91 or 92, and the wires 89 and 90 leading to the terminal posts A or C. If the cell 81 is conductive, current will flow through the motor 72 in a direction from left to right, as viewed in FIG. 1, whereas when the cell 82 is conductive current will flow through the motor 72 from right to left as viewed in the figure. Accordingly, illumination of the cell 81 will effect, by assumption, a forward direction of the motor 72 whereas illumination of the cell 82 will effect a reverse rotation of the motor, and the arrangement is such that the deflection of the galvanometer 37 and direction of turning of the shutter 77 is such as to illuminate that one of the light sensitive cells 81, 82 which will drive the motor 72 so as to shift the slider 49 in a direction to reduce the deflection of the galvanometer 37. Thus a balance is re-established automatically at any time that a temperature change occurs at the thermocouple 36 which alters the generated E.M.F. of the couple. The new balance results from a shifted position of the slider 49, whereby the new temperature will be indicated by the pointer 69 moving over the scale 71.

By the present invention the motor power supply wires 99 and 52 are not connected directly to each other, but instead have interposed between them the resistor 43 which constitutes a portion of the bridge circuit 34. This organization provides an anticipating device which tends to decrease the magnitude of unbalance in the bridge circuit 34 in response to energization of the motor 72, and this effects a slow-down of the movement of the motor and prevents hunting, by which it is possible to obtain a more rapid ultimate stable restoration of the balance of the bridge circuit. It can be understood that when any current flows in the circuit of the motor 72, such current will also flow in the anticipator resistor 43 contained in the bridge circuit, and this current, depending on its direction, may increase or else decrease the unbalanced condition of the bridge 34. By causing it to decrease the unbalance of the bridge, the galvanometer 37 is caused to deflect to a lesser extent, resulting in a lesser illumination of one or the other of the photosensitive cells 81, 82 and this in turn will decrease the energization of the motor 72, thereby to predeterminately slow the action of the motor and similarly slow the restoring movement of the slider 49 by which hunting is prevented and a stable bridge balance is quickly established. The provision of the anticipator 43 and its organization in the balancing and control circuitry of the indicator comprises an important feature of the invention. The anticipator resistor 43 acts as a damping means to minimize overshooting of the motor 72 and the slider or contact 49, by virtue of its effect in tending to decrease the unbalanced condition of the bridge.

The thermocouple 36 is shown as connected to the galvanometer 37 and slider 49 by a cable 50, and by virtue of the cable or leads 50 being in series with the galvanometer, the lengths or resistances of the leads or cable, or changes in the resistance thereof, will not disturb the balance of the bridge, nor will it have any effect on the action of the anticipator 43. This is due to the fact that when a balanced condition of the bridge circuit 34 is had no current flows in the cable 50 or in the thermocouple 36 or galvanometer 37. Accordingly, in the absence of any current there will be no voltage drop at any point in this galvanometer circuit, for a balanced condition of the bridge. Thus, the effect of the cable resistance is nil when a balance is restored, eliminating any adverse effect on the anticipator action or on the reading of the pointer 69.

To apprise a user of the energized or non-energized condition of the indicating instrument, an indicator device is provided, comprising an electro-magnet 100 having an armature 101 biased by a spring 102. The armature 101 may carry an indicator flag 103 or any other suitable visible indicator device, which will show by its position whether or not the instrument is energized.

While various values for the components of the circuit of FIG. 1 may be utilized, a specific set of values which has been found advantageous is as follows:

The current limiting resistors 91 and 92 may each have a resistance of 600 ohms. Where the transformer is to be energized from a commercial power source as for example a supply of 117 volts the primary winding may have a D.C. resistance of 90 ohms and the secondary windings may have a total D.C. resistance of 12.5 ohms, with a turn ratio to provide a total secondary voltage of 25.3 volts. The voltage for the lamps 74 and 75 from the center tap 76 may be 5.3 volts, and the voltage across the remainder of the secondary winding 15 may be 20 volts. The voltages between the posts A and B, and B and C will be approximately 30 volts each. Resistor 56 may have a resistance of 2,000 ohms, resistor 61 a resistance of 500 ohms, resistor 57 a resistance of 9 ohms, resistor 67 a resistance of 500 ohms, resistor 39 a resistance of 2680 ohms, resistor 40 a resistance of 2665 ohms, resistance unit 41 of the potentiometer device a nominal resistance of 15 ohms, between 0° C. and 1000° C. Resistor 42 may have 3 ohms resistance, the cold junction compensating resistors 44 and 45 may have a combined resistance of approximately 3 ohms at 0° C. The anticipator resistor 43 may have a small ohmic value, as required to effect the desired damping action, such value being normally under 10 ohms to be commensurate with the values of the adjoining legs of the bridge.

It will now be seen from the above description that an automatic, servo-type control is established between the galvanometer 37 and the slider 49, utilizing in a simple and effective circuit, light beams and light-sensitive conductive cells which latter directly carry the current for a reversible electric motor. The movable system of the galvanometer 37 including the shutter 77 having the slotted plate 78 may be extremely light in weight and have a small size, and the incandescent bulbs 74, 75 may also be of the small or miniature type. Likewise, the light-sensitive cells 81, 82 are small and light in weight, and this same is true of the miniature electric motor 72. Accordingly, it is seen that the servo-type control as thus provided by the invention comprises relatively few parts which have small size and which may be compactly arranged into a light-weight unit. Moreover, the uncomplicated nature of the organization and the small and few moving masses involved result in quick, accurate and reliable indications being had at all times.

Another embodiment of the invention is illustrated in FIG. 2, which is to be taken in conjunction with the circuit diagram of FIG. 1, being substitutable for the right-hand portion of FIG. 1 and being arranged for connection to the terminal posts B, C and D in this figure. That is, the connections to the terminals posts A, B and D leading from the voltage regulator 54 and the balancing circuit 34 are to be broken, and instead the circuit of FIG. 2 is to be substituted, making connections to the terminals B, C and D from the terminals B', C' and D'.

By such substitution the balancing or bridge circuit 34 and the voltage regulator circuit 54 are replaced by a new balancing circuit or bridge 105 which is of the resistance-bulb type instead of the thermocouple type shown in FIG. 1. The balancing circuit 105 comprises resistors in a closed loop, and the bridge loop includes the resistance bulb 107, the cable or leads 108 for the bulb, a resistor 109, a potentiometer-type resistance device 110 and shunted resistor 111 therefor, a resistor 113, an anticipating resistor 114 and a final resistor 115 all connected in series with the exception of the shunt connection of the resistor 111 with the potentiometer resistor 110. The device 110 has a slider or adjustable contact 117 which is connected with the galvanometer 18, the latter being connected by a wire 119 to the juncture between the resistor 15 and the cable 108. The slider 117 is mechanically coupled to the motor 72, as indicated by the broken line 70'. The galvanometer 118 is mechanically coupled to the shutter 77, as indicated by the broken line 84'.

The juncture between the resistors 113 and 114, comprising one "corner" junction of the bridge 105, is connected by a lead or wire 120 to the terminal post B'. One end of the resistance bulb 107 is grounded as indicated at 122, and a ground wire 124 is shown as connected to the terminal post C'.

The anticipator resistor 114 is provided with a slider 126 by which the anticipating effect is adjustable. The slider 126 is connected by a wire 128 with the terminal post D'.

The operation of the balancing circuit 105 shown in FIG. 2 is generally similar to that of the bridge circuit 34 shown in FIG. 1, except that changes in temperature of the resistance bulb 107 effects a change in the resistance thereof, whereas in the circuit of FIG. 1 changes in the temperature of the thermocouple 36 changes the value of the generated E.M.F. thereof. However, in both instances a change in temperature of the sensing element will effect an unbalance of the bridge circuit, whereby the galvanometer will be deflected. Deflection of the galvanometer 118 from the zero position will shift the shutter 77, so as to cause illumination of one or the other of the light-sensitive conductive cells 81, 82 thereby to effect either forward or reverse operation of the motor 72 so as to shift the slider 117 in a direction to restore the balance of the bridge. The energizing current for the motor 72 passes through the anticipator resistor 114 and tends to minimize the effect of unbalance of the bridge 105, thereby to decrease the deflection of the galvanometer and to decrease the illumination of the photo-sensitive cell by which a lesser energization of the motor 72 is effected, thereby to provide a less rapid shifting of the slider 117 in a direction to restore the balance of the bridge circuit. As with the circuit of FIG. 1, the servo-type indicator represented by FIG. 2 is simple in its construction, fast and accurate in its response, and involves relatively few parts which may be of small size, and which may be compactly arranged in a light-weight indicator device.

In FIG. 2 the following values of the resistors have been found to be advantageous. For the resistance element of the potentiometer device 110, a resistance of 29.21 ohms. For the resistor 113, a resistance of 2012.77 ohms. For the anticipator resistance element 114 of the anticipator device, a resistance of 30 ohms. For the resistor 115, a value of 2000 ohms, and for the resistor 109 a value of 77.85 ohms. The shunt resistor 111 has a value adapted to operate with the available potentiometer 110 for giving the desired results, and is normally under 50 ohms.

Another embodiment of the invention, wherein an alternating-current type adjusting motor is utilized, instead of the direct-current type motor shown in FIGS. 1 and 2, is illustrated in FIG. 3. In this figure, the balancing or bridge circuit is indicated by the numeral 130. Such bridge circuit comprises a closed loop of resistors, including a resistance bulb 131, cable or lead wires 132 therefor, resistor 134, potentiometer type resistance device 136, resistor 137, anticipating resistors 138 and 139, and resistor 141, the latter being connected to one lead wire of the cable 132 by a wire 143. The potentiometer device 136 has a slider or adjustable contact 145 connected with a galvanometer 146 which is in turn connected to the wire 143. The slider 145 and the wire 143 constitute two opposite "corner" junctions of the bridge, whereas the common connection 148 between the two anticipator resistors 138 and 139 constitutes a third "corner" junction. The fourth "corner" junction of the bridge comprises a ground connection 150 made to one terminal of the resistance bulb 131. Changes in the temperature of the resistance bulb 131 will upset the balance of the bridge, effecting a deflection of the galvanometer 146, and a restoration of the balance may be effected by suitable adjustment of the slider 145, the newly adjusted position of the slider being indicative of the new temperature value and all adjusted positions of the slider being capable of calibration in values of temperature.

The power supply for the bridge 130 comprises a power transformer 153 having a primary winding 11' connected to supply terminals 12', 13'. The transformer 153 has a tapped secondary winding 15' one terminal of which is connected by a wire 158 to a ground 159. The other terminal of the secondary winding 15' is connected by a wire 161 to a half-wave rectifier 163 which is in turn connected to a power supply terminal K. The ground 159 is connected to a power supply terminal J. Between the terminals J and K a smoothing or filter capacitor 28' is connected. The terminal K is connected by a wire 167 to the common juncture 148 of the anticipator resistors 138, 139. Thus, the opposite "corner" junctures of the bridge circuit 130 are supplied with voltage from the terminals J and K as illustrated.

The secondary winding 15' is also utilized to energize the pair of lamps 74', 75' by the connections illustrated, including a wire 169 connected to the tap 76'.

Associated with the incandescent lamps 74', 75' is the shutter 77 having the light obstructing plate 78 and a slot 79. The shutter 77 is mechanically coupled to the galvanometer 146, as indicated by the broken line 84'. The circuit of FIG. 3 includes a pair of light-sensitive conductive cells 81' and 82', which are arranged to individually receive joint light from the lamps 74', 75', upon the shutter 77 being suitably shifted in a manner already explained above.

In accordance with the present invention, in conjunction with the bridge 130 having the anticipator resistors 138 and 139 there is provided a novel control mechanism utilizing the conductive cells 81', 82', which is characterized by an A.C. servomotor arranged to reversibly drive and adjust the slider 145 of the potentiometer device 136. The A.C. servomotor is indicated generally by the numeral 172 in FIG. 3. It comprises an exciting winding 174 having a series-connected phase-shift capacitor 175, these parts being joined by wires 176 and 177 respectively to the supply terminals 12', 13'.

The servomotor 172 further has a control winding 179 (hereinafter also called an "energizable" winding) bridged by a capacitor 180, one terminal of the winding 179 being connected by a lead wire 182 to the center tap 183 of a further secondary winding 184 of the transformer 153. The two terminals of the secondary winding 184 are connected respectively by wires 186 and 187 to the photo-sensitive cells 81' and 82'. From the photo-sensitive cells 81', 82' leads go to current limiting resistors 91', 92' respectively, and such resistors are connected by wires 189 and 190 to rectifiers 191 and 192 respectively, such rectifiers facing oppositely with respect to the associated cells 81', 82'. The rectifiers 191, 192 have a common junction 194 which is connected by a wire 195 with the junction between the anticipator resistor 139 and the bridge resistor 141. The juncture between the anticipator resistor 138 and the bridge resistor 137 is connected by a wire 197 to the remaining terminal of the control winding 179 of the servomotor 172. Additional rectifiers 200 and 201 have a common junction 202 connected to the wire 197, and at their remote ends are connected respectively to the wires 189 and 190.

By such organization it will now be seen that when one or the other of the photo-sensitive cells 81', 82' is made conducting as by either of such cells being illuminated by the lamps 74', 75' it will cause either of two instantaneously opposite or in effect phase-displaced alternating currents (due to the center-tap connection 183) to flow through the control winding 179 of the servomotor, such currents each comprising slightly unequal alternate pulses by virtue of the action of the half-wave rectifiers 191, 192, 200 and 201 together with the anticipator resistors 138 and 139 in the motor circuit. Considering the case when the light cell 81' is made conducting, at one given instant a pulse may flow downward through such cell as viewed in FIG. 3, from right to left through the resistor 91' and wire 189, downward through the rectifier 191, upward and from left to right through the wire 195, from right to left through the anticipator resistors 139, 138, from right to left and downward through the wire 197, from left to right through the control winding 179 of the motor 172, and upward through the wire 182 to the center tap 183 of the secondary winding 184. The next or succeeding pulse, which will be only very slightly stronger, will flow downward from the center tap 183 through the wire 182, from right to left through the motor winding 179 upward through the lower portion of the wire 197, upward through the rectifier 200, from left to right through the wire 189 and resistor 91', upward through the cell 81' and back to the secondary 184. This unequal-pulse alternating current having a given instantaneous direction or phase position will energize the motor 172 for turning in one direction, which may be assumed to be the forward direction. Reverse turning of the motor 172 is effected then in consequence of the light sensitive cell 82′ being rendered conducting so as to apply an alternating current which is of opposite instantaneous direction or in effect 180° phase-displaced with respect to the current described above, and for such condition a very slight inequality of the pulses will also exist. At one given instant a "weak" pulse may be assumed as flowing downward in the wire 182, from right to left in the control winding 179 of the motor 172, upward and from left to right in the wire 197, from left to right in the anticipator resistors 138, 139 from right to left and downward in the wire 195, downward through the rectifier 192, from left to right in the wire 190 and resistor 92′, downward through the cell 82′, and from left to right and upward in the wire 187, thereby to return to the secondary winding 184. The next succeeding pulse, which will be only very slightly stronger, will flow upward in the cell 82′, from right to left in the resistor 92′, and wire 190, upward in the rectifier 201, downward in the lower portion of the wire 197, from left to right in the winding 179 and thence back up through the wire 182 to the secondary 184. The current effected by conduction of the cell 82′ being instantaneously opposite or in effect phase-displaced with respect to the current effected by the cell 81′ due to the center tap connection, results in reversal of the motor 172. With such connections, so far as they have been described above, the anticipator resistors 138, 139 virtually carry a half wave of the full current passing through the control winding 179 of the servomotor 172 and either of the light cells 81′, 82′ carries the said full current when the indicator is operative. Although because of the shunting effect of the rectifier circuits a small portion of the control winding current is actually shunted around the anticipator resistors 138, 139, this is so small as to be negligible. In FIG. 3 such shunting circuits include the two additional rectifiers 200 and 201 which have their common juncture 202 connected to the wire 197. Strictly speaking, by these connections the weaker pulse which flows to the left through the wire 189 and down through the rectifier 191 will divide at the juncture 194, and a very small portion of such pulse will flow through the rectifiers 192 and 201 to the wire 197 and hence to the control winding 179 whereas the remainder, constituting the bulk of the current will pass through the wire 195 and anticipator resistors 138, 139 in a right to left direction, for example. In this connection it is noted that the rectifier impedances are high, compared with that of the anticipator resistors 138 and 139. Similarly, a pulse advancing upward in the lower portion of the wire 197 will divide at the juncture 202, a major portion passing from left to right in the upper portion of the wire 197 and from left to right to the anticipator resistors 138 and 139 whereas the negligible remainder of the pulse will pass through the rectifiers 200 and 191 to the juncture 194, and then through the rectifier 192 to the return circuit 190, 92′, 82′ and 187. Where the rectifiers require a certain minimum voltage before they conduct in a forward direction, the shunting current may actually be non-existent due to the small drop across the anticipator resistors. In each case the bulk of such pulses, passing through the anticipator resistors 138, 139 has the effect of decreasing the unbalance of the bridge, whereby a lesser deflection of the galvanometer 146 is had, in turn decreasing the illumination of the particular photo-sensitive cell 81′, 82′ which is involved and thus decreasing the energization of the servomotor 172 so as to lessen the restoring, shifting movement of the slider 145 of the potentiometer device 146 and prevent over-run and hunting. Thus, the ultimate restoring of the bridge balance is hastened by the anticipator resistors 138, 139 which eliminate hunting, as with the anticipating means described in connection with FIGS. 1 and 2, since a desirable damping action is had. It will be understood that reversal of pulse direction in the motor control winding 179 has the same effect as if the phase of the control winding current is shifted 180°.

In all three forms of the invention the novel control is characterized by the conductive-type photo-sensitive cells being connected to carry the energizing current of an adjusting motor, whether the latter be of the alternating current or direct current type.

Further, the organizaiton in each embodiment includes an anticipating means by which hunting in the restoring action of the bridge circuit is eliminated, thereby to hasten the end response or indication of the indicator. The circuits are seen to be simple and to involve relatively few components, and few moving parts. In addition to the fast response, the indicator is accurate in its functioning and reliable, and may be arranged in a compact manner and in relatively small space.

It will be noted that with the embodiments of FIGS. 2 and 3 the cables 108 and 132 are arranged in a portion of the bridge circuit which is on the opposite side of the galvanometer circuit from the portion containing the anticipator resistor, whereby changes in the resistance of the transducer leads will not affect the anticipating action nor will it detract from the accuracy of the indication.

Variations and modifications may be made within the scope of the claims, and portions of the improvements may be used without others.

We claim:

1. A servo-type electrical indicator comprising, in combination, a temperature-responsive electrical sensing element; a balancing circuit connected to said element and having an adjustable device by which a balance of the circuit may be restored when an unbalance occurs due to changes in the temperature of the said element; an indicator connected to said device for actuation thereby; reversible electrical motive means having an energizable winding, for reversibly actuating said adjustable device; a power circuit for said motive means, said circuit having a current source and having selective switching devices operable to effect substantially an open-circuit or a closed-circuit from the current source through the motive means, said switching devices comprising a pair of light sensitive, conductive type switching cells having a joint connection to the energizable winding of the motive means whereby either cell can carry the full current through the motive means, said cells when separately conductive effecting selective energization of the winding of the motive means to cause forward or reverse operation of the latter; light means; and control means responsive to an unbalance of the balancing circuit, for effecting illumination of solely one or else the other of the switching cells from the light means in a manner to operate the motor and said adjustable device so as to restore the balance condition of the circuit, said control means including a reversibly-moved, opaque apertured shutter adapted to block or else to pass light through it from the light means to solely one of the light cells at a time.

2. A servo-type electrical indicator comprising, in combination, a temperature-responsive electrical sensing element; a balancing circuit connected to said element and having an adjustable device by which a balance of the circuit may be restored when an unbalance occurs due to changes in the temperature of the said element; an indicator connected to said device for actuation thereby; reversible electrical motive means having an energizable winding, for reversibly actuating said adjustable device; a power circuit for said motive means, said circuit having a current source and selective switching devices which are individually operable to effect substantially an open-circuit or a closed-circuit from the current source through the motive means, said switching devices comprising a pair of light sensitive conductive type switching cells having a joint connection to the energizable winding of the motive means whereby either cell carries the full current through the motive means, said cells when separately conductive effecting selective energization of the winding of the motive means to cause forward or reverse operation thereof; light means; control means responsive to an unbalance of the balancing circuit, for effecting illumination of solely one or else the other of the switching cells from the light means in a manner to operate the motor and adjustable device so as to restore the balance condition of the circuit; and anticipator means comprising a resistor connected to said balancing circuit, tending to decrease the magnitude of the unbalance in response to energization of the motive means, thereby to effect a slowing-down of movement of the motive means for minimizing hunting and restoring more quickly to ultimate balance of the circuit, said resistor being connected in series with the motive means to carry at least a major portion of the energizing current for the latter.

3. The invention as defined in claim 2 in which the motive means comprises a sensitive D.C. motor which reverses direction in response to reversal of current therethrough.

4. The invention as defined in claim 2 in which the moitve means comprises an A.C. servo-motor whose control winding comprises the said energizable winding, and in which the switching cells in the power circuit effect alternating currents which are instantaneously opposite or phase-displaced to cause forward or reverse operation of the motor.

5. The invention as defined in claim 4 in which the power circuit includes a center-tapped winding, the tap of which is connected to the said control winding, and includes rectifiers connected to the winding ends and faced one toward its associated end and the other away from its associated end, said rectifiers having a common junction connected with the said control winding.

6. The invention as defined in claim 5, in which there is an anticipator resistor interposed in the connection from the common junction to the control winding, said resistor being also included in the balancing circuit.

7. The invention as defined in claim 6 in which there are two additional rectifiers having a common junction connected to said control winding and having their remaining terminals connected to said winding ends, all said rectifiers being connected in a closed-circuit wherein they all pass current in the same direction through the closed circuit.

8. The invention as defined in claim 2 in which the light means comprises a pair of bulbs disposed adjacent the shutter and jointly registreable with the aperture thereof when the shutter is suitably moved.

9. The invention as defined in claim 2 in which the balancing circuit comprises a bridge having a sensitive instrument movement, in which the control means comprises a movable part of said movement, and in which the anticipator means and sensing element are connected to portions of said bridge on opposite sides of the connections to the instrument movement whereby the anticipator means is not affected by the lead resistance of the sensing element.

References Cited in the file of this patent

UNITED STATES PATENTS

| | | |
|---|---|---|
| 2,652,524 | Hornfeck | Sept. 15, 1953 |
| 2,674,707 | De Mott | Apr. 6, 1954 |
| 2,887,642 | Ehret et al. | May 19, 1959 |
| 2,915,695 | Zimmerli | Dec. 1, 1959 |
| 2,968,756 | Devol | Jan. 17, 1961 |